March 10, 1931.  H. E. BRUNHOFF  1,795,830
ELECTRICAL COOKING UTENSIL
Filed July 3, 1929
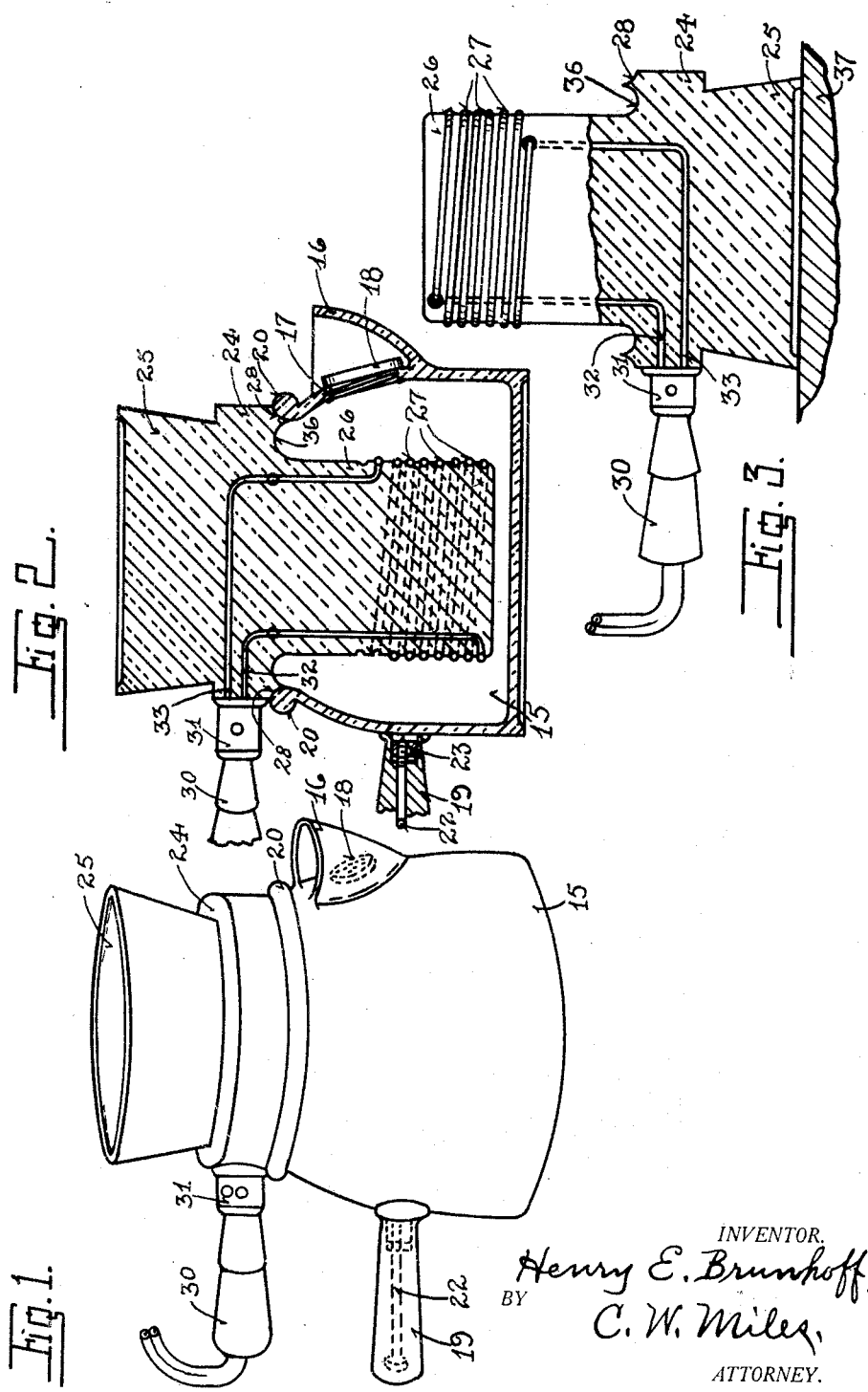
INVENTOR.
Henry E. Brunhoff,
BY
C. W. Miles,
ATTORNEY.

Patented Mar. 10, 1931

1,795,830

UNITED STATES PATENT OFFICE

HENRY E. BRUNHOFF, OF WYOMING, OHIO

ELECTRICAL COOKING UTENSIL

Application filed July 3, 1929. Serial No. 375,656.

My invention relates to improvements in electrical cooking utensil. One of its objects is to provide a simple and reliable electrically heated coffee cooker. Another object is to provide a coffee cooker adapted to be readily kept clean and in condition for use. Another object is to provide in a coffee cooker or similar container, an improved electrical heating member therefor, and one adapted to be readily separated from the container and having a supporting base of its own. Another object is to provide an improved electrical heating member adapted to be detached from the container and separately supported, and which is adapted to prevent fluid adhering to the heating member dripping upon its base or its supporting member. My invention also comprises certain details of form and arrangement and combination of components, all of which will be fully set forth in the description of the accompanying drawings in which Fig. 1 is a side elevation of my improved apparatus.

Fig. 2 is a central vertical section through the same.

Fig. 3 is a side elevation partly in central vertical section of the heating member detached from the container and inverted into its self-supporting position.

The accompanying drawings illustrate one embodiment of my invention in which 15 represents a coffee pot or fluid container, preferably constructed from porcelain, glass or similar material adapted to be readily kept clean and in sanitary condition. The container is also preferably of a material adapted to receive and retain advertising matter or ornamental design upon its exterior. The container is provided with a spout or pouring lip 16, and a perforation 17 in which a strainer member 18 preferably of metal is adapted to be detachably secured. The container 15 is open at the top with an annular bead 20 encircling said opening and is provided with a handle 19, preferably of heat non-conducting material, detachably attached to the container by means of a bolt 22 threaded into a nut or metal lined socket 23, carried by the container 15.

The heating member comprises a body of porcelain glass or similar material 24, one end 25 of which forms a broad base or support for the heating member when detached from the container and inverted as shown in Fig. 3. The opposite end of the body 24 forms a stem 26 projecting down into the fluid in the container 15 when seated thereon, and which stem has wound upon the exterior thereof a coil of bare metal wire 27, for instance of nickel wire, nichrome wire, or other wire adapted to resist oxidation or corrosion when in use for such purpose.

An annular seat 28 intermediate of the ends 25 and 26 of the body 24 forms a practically tight joint with the bead 20 at the mouth of the container, thereby supporting the body 24 upon the container with the stem 25 and coil 27 immersed in the fluid in the container. The body 24 is provided with a handle 30 preferably of heat non-conducting material which is provided with an electrical switch 31 at the base thereof adapted to be rotated and thereby open or close an electrical circuit through the coil 27. The coil 27 has considerably electrical resistance while the lead wires 32 and 33 from the switch 31 to the ends of said coil are of copper wire or other wire of large section and small electrical resistance, whereby practically all of the heat is developed in the coil 27, which being in direct contact with the fluid in the container, causes the fluid to take up and conduct away the heat as fast as developed, keeping the coil 27 at approximately the temperature of boiling water or lower, and causing the fluid in container 15 to boil within less than a minute after the circuit is closed. After the fluid has boiled for a sufficient length of time, the circuit is opened at the switch 31, and the heating member may be lifted from the mouth of the container and inverted and seated upon any convenient supporting shelf or table as indicated in Fig. 3, while the fluid from container 15 is poured through the screen 18 and spout 16 for use.

When the heating member is inverted any moisture adhering to the stem 26 or coil 27 flows down into the annular trough 36 where it is retained and prevented from dripping upon the member 37 supporting the heating member. The leads from the switch 31 to the terminals of the coil 27 are through the body of the member 24, which serves to insulate the same. The heating member is adapted to be readily kept clean and sanitary, and the container is also adapted to be readily kept clean and sanitary. The container and heating member are both adapted to be constructed at low cost, and are both adapted to receive and display ornamental designs or advertising matter; and the first cost is within the range of useful articles employed as advertising novelties.

The apparatus herein shown and described is capable of considerable modification within the scope of the claims without departing from the spirit of the claims.

What I claim is:

1. In combination with a fluid container, a lid for said container adapted to detachably seat upon the open mouth of said container, a stem projecting downwardly from said lid into the fluid contents of said container and provided with an electrical heating member to be immersed in the fluid contents of said container, said lid being provided with a supporting face, adapted to separately support said lid in an inverted position and an annular drip channel to catch and hold any fluid which may be carried by and flow from said stem when removed from the fluid container and inverted in position.

2. In combination with a fluid container, a lid for said container adapted to detachably seat upon the open mouth of said container, a stem projecting downwardly from said lid into the fluid contents of said container and provided with an electrical heating member to be immersed in the fluid contents of said container, said lid being provided with a supporting face adapted to separately support said lid in an inverted position, an annular drip channel to catch and hold fluid flowing downwardly from said stem in its inverted position, a lid handle and an electrical switch to open and close an electrical circuit through said heating member.

3. An electrical heater for fluid containers, composed of a body of non-conducting material having one end formed to seat on a supporting surface so as to sustain the body in a substantially vertical position, electrical heating means on the opposite end of the body for immersion in the fluid, and drip catching means on the body between the ends thereof to catch and hold drippings upon the body being supported from said first named end thereof.

4. An electrical heater for fluid containers, composed of a body of non-conducting material having one end formed to seat on a supporting surface so as to sustain the body in a substantially vertical position, electrical heating means on the opposite end of the body for immersion in the fluid, drip catching means on the body between the ends thereof to catch and hold drippings upon the body being supported from said first named end thereof, and a handle extending radially from the body at a point between the drip catching means and said first named end of the body.

5. An electrical heater for fluid containers, composed of a body of non-conducting material having one end formed to seat on a supporting surface so as to sustain the body in a substantially vertical position, electrical heating means on the opposite end of the body for immersion in the fluid, and a handle extending radially from the body at a point between the ends thereof whereby to enable reversal of the body end for end.

In testimony whereof I have affixed my signature.

HENRY E. BRUNHOFF.